US011186401B2

(12) United States Patent
Giuliani et al.

(10) Patent No.: US 11,186,401 B2
(45) Date of Patent: Nov. 30, 2021

(54) LABELLING MACHINE CONFIGURED TO APPLY LABELS ONTO ARTICLES FOR CONTAINING A POURABLE PRODUCT

(71) Applicant: SIDEL PARTICIPATIONS, Octeville-sur-Mer (FR)

(72) Inventors: Mattia Giuliani, Parma (IT); Stefano Corradini, Mantova (IT)

(73) Assignee: SIDEL PARTICIPATIONS, Octeville-sur-mer (FR)

( * ) Notice: Subject to any disclaimer, the term of this patent is extended or adjusted under 35 U.S.C. 154(b) by 12 days.

(21) Appl. No.: 16/840,320

(22) Filed: Apr. 3, 2020

(65) Prior Publication Data
US 2020/0317384 A1   Oct. 8, 2020

(30) Foreign Application Priority Data

Apr. 4, 2019  (EP) ..................................... 19305442

(51) Int. Cl.
*B65C 9/04* (2006.01)
*B65C 3/08* (2006.01)
*B65C 9/18* (2006.01)
*B65G 47/91* (2006.01)
(Continued)

(52) U.S. Cl.
CPC .................. *B65C 9/04* (2013.01); *B65C 3/08* (2013.01); *B65C 9/1815* (2013.01); *B65G 47/91* (2013.01); *B65C 3/14* (2013.01); *B65C 3/16* (2013.01); *B65C 3/163* (2013.01); *B65C 9/1826* (2013.01)

(58) Field of Classification Search
CPC .... B65C 3/08; B65C 3/14; B65C 3/16; B65C 3/163; B65C 3/166; B65C 9/1815; B65C 9/1826
See application file for complete search history.

(56) References Cited

U.S. PATENT DOCUMENTS 4,832,774 A * 5/1989 DiFrank .................... B65C 3/16
156/215
2012/0261233 A1   10/2012 Huettner et al.

FOREIGN PATENT DOCUMENTS

| DE | 102011080121 A1 | 1/2013 |
| EP | 2889238 A1 | 7/2015 |
| WO | 2018202320 A1 | 11/2018 |

OTHER PUBLICATIONS

European Search Report for European Application 19305442, dated Oct. 8, 2019.

* cited by examiner

*Primary Examiner* — Carson Gross

(57) ABSTRACT

Disclosed is a labelling machine for articles containing pourable product, comprising: a first endless conveyor to advance a number of articles along part of an endless article path, from an input station to an application station and from the application station to an output station; and a second endless conveyor to advance a number of labels along part of an endless label path, from a receiving station to the application station; the first conveyor comprises an article holding device movably coupled to the first conveyor, configured to carry one respective article from the input station to the output station and controllable along the article path by means of magnetic-inductive interaction; the second conveyor comprises a label holding device movably coupled to the second conveyor, to carry one respective label from the receiving station to the application station and controllable along the label path by means of magnetic-inductive interaction.

13 Claims, 5 Drawing Sheets

(51) Int. Cl.
*B65C 3/14* (2006.01)
*B65C 3/16* (2006.01)

LABELLING MACHINE CONFIGURED TO APPLY LABELS ONTO ARTICLES FOR CONTAINING A POURABLE PRODUCT

TECHNICAL FIELD

The present invention relates to a labelling machine configured to apply labels onto articles, such as bottles, cans or the like, for containing a pourable product, preferably a pourable food product.

BACKGROUND ART

As it is generally known, the packaging of food or non-food products into respective articles, such as containers, bottles, cans, receptacles and the like, comes along with the labelling of the articles by means of respective labels, in particular paper or plastic labels, during a labelling process performed by means of a labelling machine.

Particularly widespread is the use of tubular labels (commonly called "sleeve labels"), typically used with beverage bottles or vessels; such labels are obtained by:
- cutting a web of labelling material, previously unwound from a supply reel, into a plurality of rectangular (or square) labels;
- bending each label in a cylindrical configuration such that the opposite end portions thereof overlap one another; and
- welding the overlapped end portions of each cylindrical label, the latter resulting in a tube-shaped sheet.

Also widely used are the so-called "glue labels", which, after being cut from a web of labelling material at an appropriate length, are soaked with glue by gluing means, such as gluing rollers, spray and injector system or the like, and are finally transferred to the respective articles.

Regardless of the typology of the label used, a common kind of labelling machine typically comprises:
- a conveying device, usually a carousel rotatable about a vertical axis and configured to convey a plurality of successive articles along a predetermined arc-shaped horizontal path;
- an input station, at which the articles to be labeled are fed to the carousel;
- an output station, at which the labeled articles exit from the carousel; and
- one or more labelling modules, peripherally arranged with respect to the carousel and configured to feed respective pluralities of labels to the carousel itself, at an application station, in order to apply such labels onto respective articles.

Generally, a labelling module of the above-mentioned type comprises:
- one or more storage unit, each usually consisting of a rotatable shaft around which a respective web of labelling material is wound, in form of a continuous strip;
- a plurality of unwinding rollers, supporting, in use, the web unwound from the shaft, and guiding the same along a feeding path;
- a cutting device, e.g. a rotating knife, configured to cut a sequence of single labels, having the same length, from the web of labelling material; and
- a label transfer device, configured to sequentially receive each label and feed such label to the carousel at the application station.

In the case of glue labels, the labelling module further comprises gluing means, e.g. at least one gluing roller, configured to apply a certain amount of glue at least onto the end portions (i.e., the leading end and the trailing end) of each single label.

Hence, the labelling machines of the above-mentioned type are configured to transport, prepare and apply labels to the relative articles.

Typically, the label transfer device is defined by a vacuum drum rotatable around its vertical axis and configured to retain the labels, by means of suction, onto an outer lateral surface thereof.

In particular, a conventional vacuum drum presents an outer lateral surface having an approximately cylindrical lobed configuration; the vacuum drum normally receives, on its outer lateral surface, a succession of labels and, after a given rotation about its axis, transfers the labels to the carousel at the application station so that they can be applied to the respective articles conveyed thereon.

More specifically, the outer lateral surface of the vacuum drum comprises a number of retaining sections, which are equally spaced angularly from each other around the vacuum drum axis, are provided with a series of ports and are adapted to cooperate in contact with respective labels.

In detail, the vacuum drum retains the labels, already pre-cut by the knife, using suction through its ports; this suction determines a negative pressure on the labels, which are thus retained on the outer lateral surface of the vacuum drum. Then, in the case of glue labels, each label is soaked with glue by means of the gluing roller. Once arrived at the application station, each glued label is released from the vacuum drum by applying a positive pressure through the ports and is then applied onto the relative article conveyed by the carousel.

Although being functionally valid, the known labelling machines are still open to further improvement, in particular as to improve their general flexibility, efficiency and reliability, and to limit as much as possible the stopping time of the labelling process, for example during a change of article format and/or label format.

DISCLOSURE OF INVENTION

It is an object of the present invention to provide a labelling machine, which allows to meet at least one of the above-mentioned needs in a straightforward and low-cost manner.

This object is achieved by a labelling machine as claimed in claim 1.

BRIEF DESCRIPTION OF THE DRAWINGS

Two non-limiting embodiments of the present invention will be described by way of example with reference to the accompanying drawings, in which.

BEST MODE FOR CARRYING OUT THE INVENTION

Figure 1:
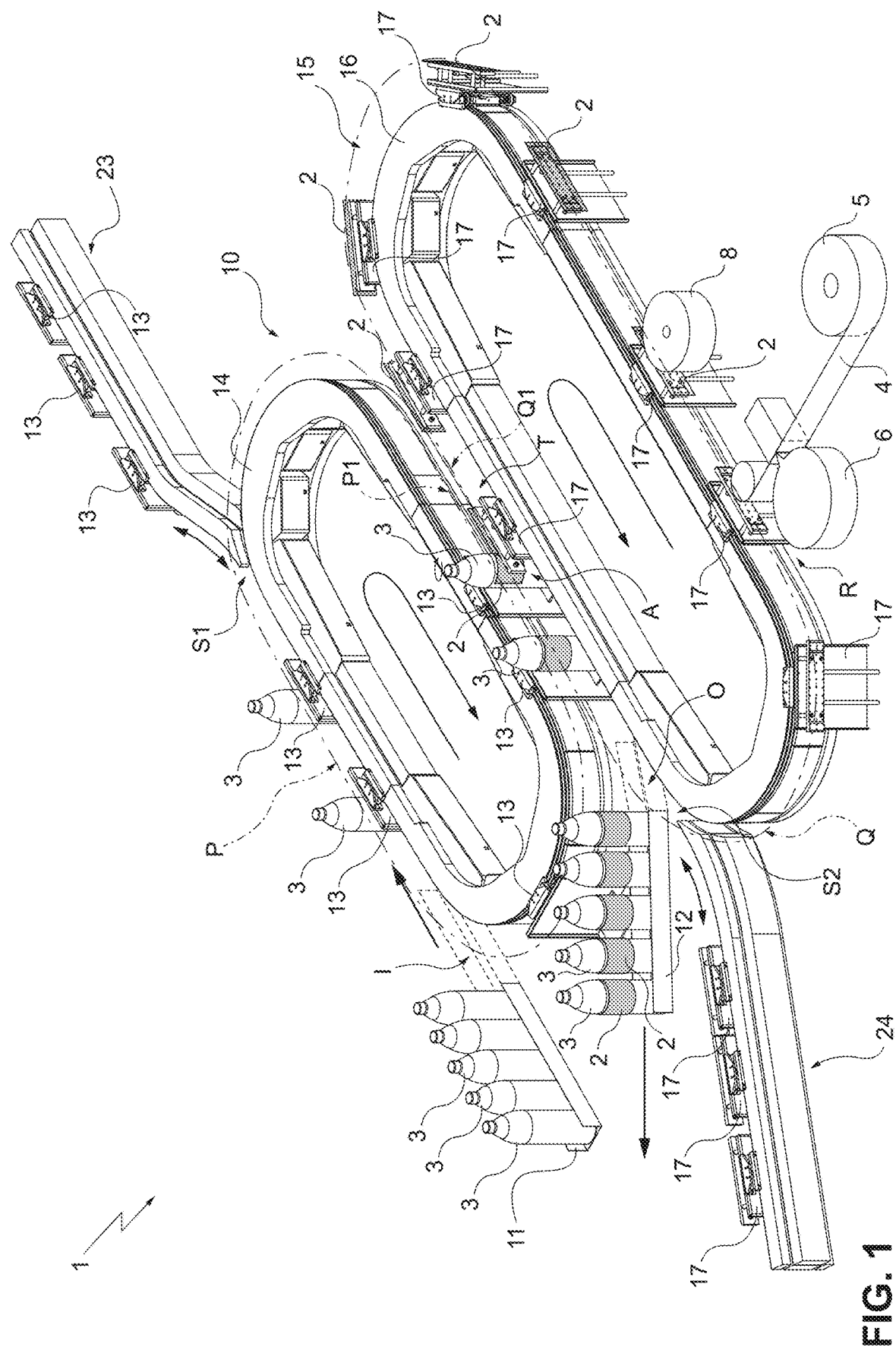
FIG. 1 is a schematic perspective view, with parts removed for clarity, of a labelling machine according to a first embodiment of the present invention.
Figure 3:
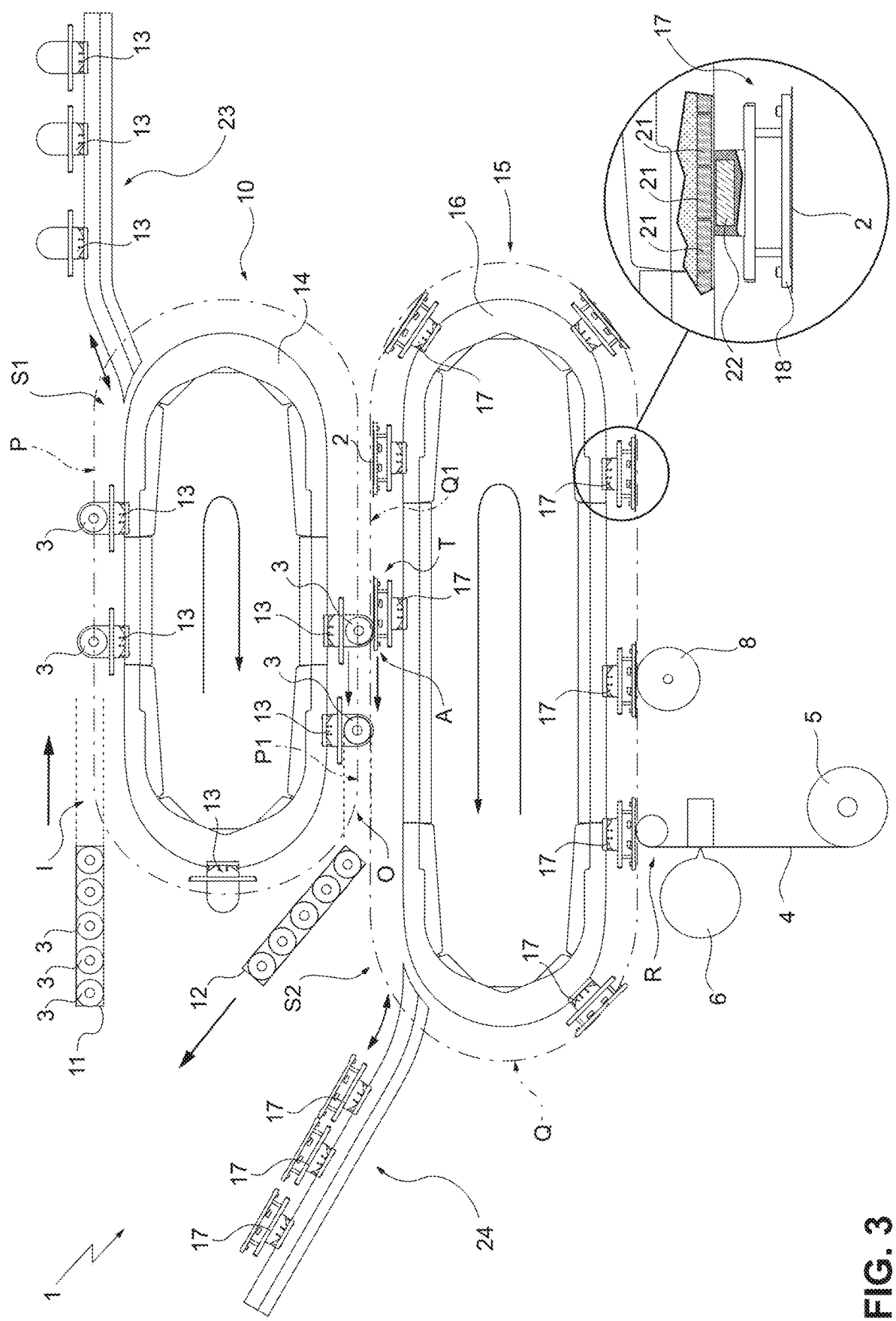
FIG. 3 is a top view, with parts removed for clarity, of the labelling machine of FIG. 1.

With reference to FIGS. 1 and 3, number 1 indicates as a whole a labelling machine configured to apply labels 2 onto articles 3, such as containers, bottles, cans or the like, adapted to contain a pourable product, in particular a pourable food product. Articles 3 are only schematically shown to the extent necessary for the comprehension of the present invention, thus the format and shape thereof is not limited to the embodiments illustrated hereby.

Labelling machine 1 is preferably part of a line for packaging pourable products and is configured to sequentially apply labels 2, obtained from a web 4 of labelling material, onto respective articles 3.

In particular, labelling machine 1 comprises a first endless conveyor 10 configured to advance a plurality of articles 3 along an endless article path P.

In detail, first conveyor 10 is configured to advance articles 3 along part of the endless article path P, from an input station I, at which the articles 3 to be labelled are fed to first conveyor 10, e.g. through an infeed track 11, to an output station O, at which the labelled articles 3 exit from first conveyor 10, e.g. through an outfeed track 12.

In greater detail, first conveyor 10 comprises a first endless track 14 defining article path P and is configured to advance articles 3 from input station I to an application station A, at which articles 3 are sequentially labelled, and from application station A to output station O.

For this purpose, first conveyor 10 comprises at least one article holder 13, in the example shown a plurality of article holders 13 movably coupled to first track 14 and configured to carry respective articles 3 along article path P.

More specifically, each article holder 13 is slidingly coupled to first track 14 so as to endlessly move, in use, along article path P and is thereby configured to carry one respective article 3 at a time from input station I to output station O.

According to this preferred embodiment shown, each article holder 13 comprises: a cart slidingly coupled to first track 14, for example by means of a cam-roller coupling; and a holding device (only schematically shown) fitted to the cart and configured to receive one article 3 at a time from input station I and to release the same article 3 at output station O, after the labelling thereof at application station A.

As visible in FIGS. 1 and 3, labelling machine 1 further comprises a second endless conveyor 15 configured to advance a plurality of labels 2 along an endless label path Q.

In the example shown, labels 2 are of the type known as "glue labels", i.e. strips of labelling material having equal length cut from web 4 of labelling material.

In detail, web 4 is initially wound in a storage reel and is progressively unwound therefrom during the labelling process.

Simultaneously, web 4 is cut by means of known cutting means, preferably a rotating knife 6, so as to obtain a sequence of rectangular labels 2 having substantially equal lengths.

The labels 2 so obtained are then fed to second conveyor 15 at a receiving station R.

In detail, second conveyor 15 is configured to advance labels 2 along part of the endless label path Q, from receiving station R, at which a sequence of single labels 2 pre-cut from web 4 is fed to second conveyor 15, to application station A, at which labels 2 are sequentially applied onto the respective articles 3 that are simultaneously advanced at application station A.

In greater detail, second conveyor 15 comprises a second endless track 16, defining label path Q, and at least one label holder 17, in the example shown a plurality of label holders 17 movably coupled to second track 16 and configured to carry respective labels 2 along label path Q.

More specifically, each label holder 17 is slidingly coupled to second track 16 so as to endlessly move, in use, along label path Q and is thereby configured to carry one respective label 2 at a time from receiving station R to application station A.

In light of the above, application station A belongs both to article path P and to label path Q, and each label holder 17 sliding along label path Q is configured to cooperate with a corresponding article holder 13 sliding along article path P at application station A, in order to determine the application of the relative label 2 on the respective article 3.

To this end, first conveyor 10 and second conveyor 15 are peripherally arranged with respect to one another at application station A, thereby defining, therebetween, a label transfer area T having application station A and within which the application of each label 2 onto the respective article 3 takes place.

In other words, application station A is arranged within label transfer area T.

In greater detail, according to this non-limiting embodiment shown, first track 14 is substantially oval-shaped; therefore, article path P is substantially oval-shaped and comprises an operative portion, preferably a straight portion P1, extending at label transfer area T.

Correspondingly, also second track 16 is substantially oval-shaped and, therefore, label path Q is substantially oval-shaped and comprises an operative portion, preferably a straight portion Q1 extending at label transfer area T facing straight portion P1 of article path P.

In particular, straight portion P1 defines one of the two long sides of article path P and, similarly, straight portion Q1 defines one of the two long sides of label path Q.

More in particular, straight portion P1 and straight portion Q1 are parallel to one another.

In use, while the above-mentioned label holder 17 is sliding along straight portion Q1 advancing the relative label 2 within label transfer area T, the corresponding article holder 13 is sliding along straight portion P1 advancing the respective article 3 to be labelled within label transfer area T.

Hence, each label 2 is transferred (and applied) to the respective article 3 within label transfer area T, according to the manner further described below.

Figure 2:
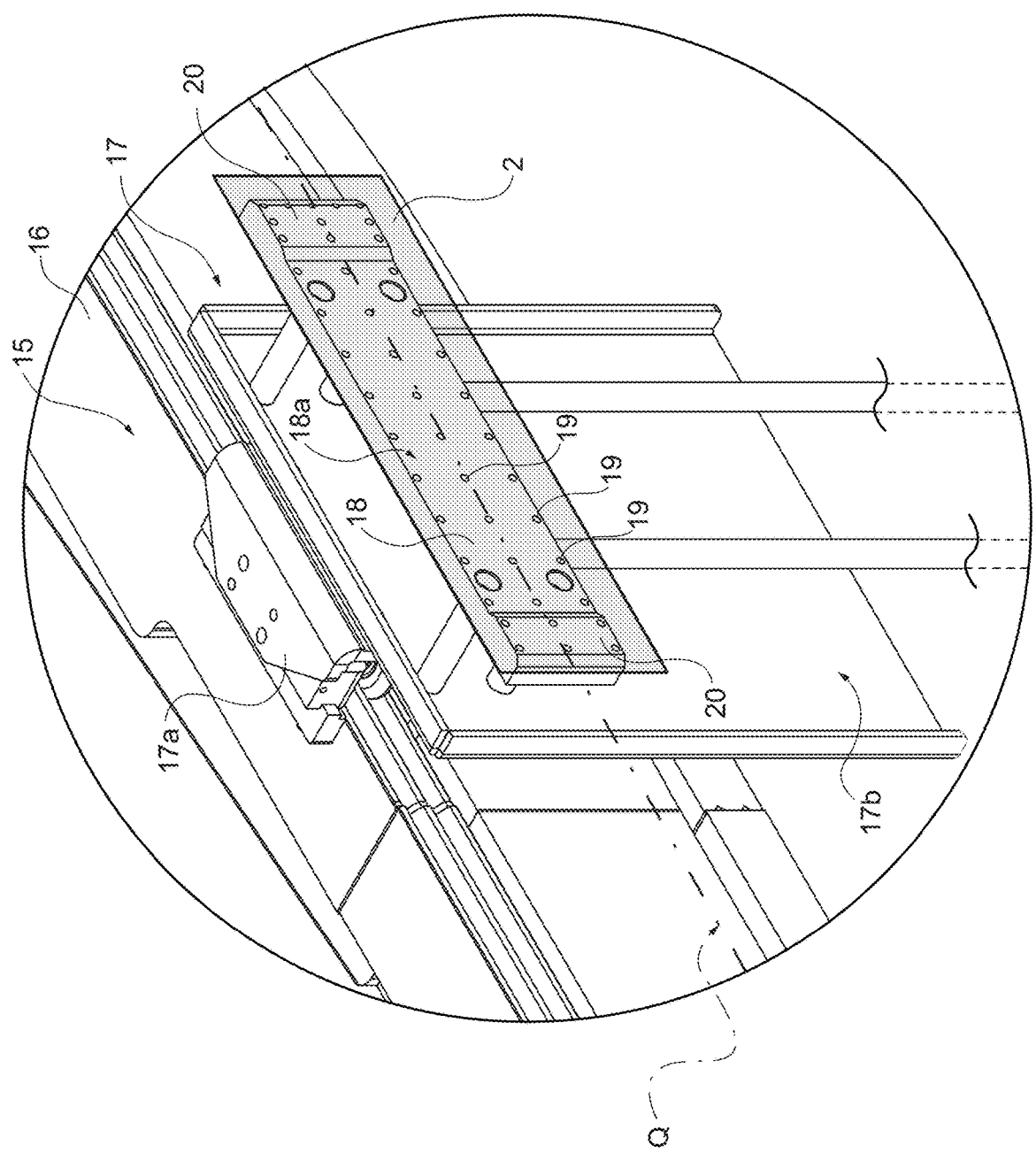
FIG. 2 is a larger-scale perspective view of a detail of the labelling machine of FIG. 1.

As shown in FIG. 2, each label holder 17 preferably comprises: a cart 17a slidingly coupled to second track 16, for example by means of a cam-roller coupling; and an holding device 17b (only schematically shown) fitted to cart 17a and configured to receive and retain one label 2 at a time from receiving station R and to release the same at application station A, in order to apply such label 2 onto the outer lateral surface of the relative article 3 to be labelled and conveyed simultaneously thereat by the corresponding article holder 13.

According to this non-limiting preferred embodiment, each label holder 17 is configured to sequentially retain one label 2 at a time by means of suction.

For this purpose, holding device 17b of each label holder 17 is provided with a receiving wall 18 configured to sequentially cooperate in contact with labels 2 and provided with ports 19 distributed on an outer lateral surface 18a thereof.

In detail retaining wall 18 is substantially rectangular and has substantially the same length as the length of each single label 2.

Ports 19 are fluidly connected, in a manner known and not described in detail, with a vacuum source configured to provide vacuum at ports 19.

In one embodiment, each label holder 17 is provided with its own vacuum source, for example a diaphragm vacuum pump.

In an alternative embodiment, all label holders 17 are fluidly connected to a centralized vacuum source.

Receiving wall 18 is further provided, at opposite lateral end portions thereof, with a pair of pads 20—in particular with a leading pad 20 and a trailing pad 20 each also provided with ports 19 and configured to retain respectively a leading end and a trailing end of the relative label 2.

In use, after being transferred to the respective label holders 17, labels 2 are soaked with glue by means of a known gluing roller 8, arranged peripherally to second track 16 downstream of receiving station R.

After being soaked with glue, labels 2 are advanced by the respective label holders 17 until they reach label transfer area T, where first and second track 14, 16 are so arranged that each label 2 reaches the respective article 3 tangentially, at application station A.

This is possible because of the above-mentioned parallel arrangement of straight portion P1 and straight portion Q1.

More specifically, referring to a single label 2 to be applied onto a relative article 3, the leading end of such label 2 contacts tangentially the outer lateral surface of article 3, thereby remaining stuck thereon due to the presence of the glue.

At this point, vacuum at ports 19 is interrupted and label 2 is progressively transferred, i.e. applied, onto article 3.

According to the present invention, article holders are controllable along article path P by means of magnetic-inductive interaction and label holders 17 are controllable along label path Q by means of magnetic-inductive interaction.

More specifically, each of first track 14 and second track 16 comprises a respective plurality of individually-excitable solenoids 21 (only schematically shown for second track 16 in FIG. 3) configured to be selectively energized with an electric current in order to produce a magnetic field.

Each one of article holders 13 and label holders 17 carries, in particular comprises, a permanent magnet 22 configured to be magnetically coupled with the solenoids 21 of the relative first or second track 14, 16, thereby defining the above-mentioned magnetic-inductive interaction.

In practice, first conveyor 10 and second conveyor 15 are of the linear motor type, the linear motor being defined by the magnetic-inductive interaction between solenoids 21 and permanent magnets 22.

According to a possible alternative embodiment not shown, first track 14 and second track 16 are provided with a plurality of permanent magnets 22, whilst article holders 13 and label holders 17 comprise the individually-excitable solenoids 21.

Conveniently, article holders 13 are configured to be controlled along article path P independently from one another. Similarly, label holders 17 are configured to be controlled along label path Q independently from one another.

In this way, the speed and pitch between two successive article holders 13 and/or label holders 17 can be varied at convenience.

Reference is made in the following to one single article holder 13 and one single label holder 17 forming a single pair of cooperating holders.

However, the following can be applied to each pair of article holders 13 and label holders 17 present in labelling machine 1.

According to this preferred non-limiting embodiment shown, article holder 13 and label holder 17 are configured to move, i.e. to slide, along the same direction while moving, in use, along straight portion P1 and straight portion Q1, respectively.

In other words, article holder 13 and label holder 17 are configured to move, i.e. to slide, along the same direction while moving within label transfer area T.

In this specific example, article holders 13 are configured to slide clockwise along first track 14, whilst label holders 17 are configured to slide counterclockwise along second track 16.

Therefore, they are configured to slide along a common concordant direction while sliding along straight portions P1 and Q1, respectively, as shown in FIGS. 1 and 3.

Due to this configuration, the respective article 3 to be labelled needs to be subjected to a rotation about its longitudinal axis in order to cause the relative label 2 to be completely wound on its outer lateral surface.

Hence, as soon as the leading end of label 2 is stuck, at application station A, onto article 3, this latter is put in rotation about its longitudinal axis, for example by means of a non-shown motor, so as to cause label 2 to wind onto its outer lateral surface.

Preferably, labelling machine 1 further comprises a first service conveyor 23 arranged peripherally, in particular laterally, to first conveyor 10 and configured to selectively receive/feed article holders 13 from/to first conveyor 10 at a first switching station S1.

Likewise first conveyor 10, also first service conveyor 23 is of the linear motor type and therefore comprises a relative plurality of solenoids 21 configured to magnetically interact with the permanent magnets 22 of article holders 13, so as to cause the movement of these latter thereon by means of magnetic-inductive interaction.

In particular, article holders 13 are selectively exchangeable between first conveyor 10 and first service conveyor 23 at first switching station S1 for maintenance thereof.

Furthermore, article holders 13 are exchangeable as a whole between first conveyor 10 and first service conveyor 23 at first switching station S1 for replacement thereof with others of different type in case of switching of article format.

According to this preferred embodiment, first switching station S1, and therefore first service conveyor 23, is arranged downstream of input station I and upstream of output station O, relatively to the clockwise direction of advancement of article holders 13 along article path P.

Correspondingly, labelling machine 1 preferably comprises a second service conveyor 24 arranged peripherally, in particular laterally, to second conveyor 15 and configured to selectively receive/feed label holders 17 from/to second conveyor 15 at a second switching station S2.

Likewise second conveyor 15, also second service conveyor 24 is of the linear motor type and therefore comprises a relative plurality of solenoids 21 configured to magnetically interact with the permanent magnets 22 of label holders 17, so as to cause the movement of these latter thereon by means of magnetic-inductive interaction.

In particular, label holders 17 are selectively exchangeable between second conveyor 15 and second service conveyor 24 at second switching station S2 for maintenance thereof.

Furthermore, label holders 17 are exchangeable as a whole between second conveyor 15 and second service conveyor 24 at second switching station S2 for replacement thereof with others of different type in case of switching of label format.

According to this preferred embodiment, second switching station S2, and therefore second service conveyor 24, is arranged downstream of application station A and upstream of receiving station R, relatively to the counterclockwise direction of advancement of label holders 17 along label path Q.

In light of the above, in case of change of article format and/or label format, by appropriately controlling article holders 13 and/or label holders 17 to move between the respective first conveyor 10 and/or second conveyor 15, through the relative first and/or second switching stations S1, S2, it is possible to replace the article holders 13 and/or label holders 17 currently in use with new ones (not shown) suitable for the new article format and/or label format.

According to an alternative embodiment not shown, labelling machine 1 comprises only one of said first service conveyor 23 and second service conveyor 24.

The operation of labelling machine 1 is described hereinafter, starting from a condition in which an article holder 13 has received an article 3 to be labelled at input station I and a corresponding label holder 17 has received a label 2 to be applied on such article 3 at receiving station R.

After being received, label 2 is soaked with glue by gluing roller 8 and then is advanced towards label transfer area T.

Simultaneously, article 3 is advanced towards label transfer area T.

Once article holder 13 and label holder 17 reach label transfer area T, more precisely application station A, the application of label 2 starts: the leading end of label 2 contacts tangentially article 3 and is stuck thereon, while article 3 is put in rotation about its longitudinal axis. In this way, label 2 is completely wound around article 3 and the application is completed.

In case one article holder 13 is detected to be defective, it can be independently controlled in order to be fed to first service conveyor 23, through first switching station S1, preferably after a new fully functioning article holder 13 has been fed to first conveyor 10.

Then, the defective article holder 13 can be removed, manually or automatically, from first service conveyor 23.

Similarly, in case one label holder 17 is detected to be defective, it can be independently controlled in order to be fed to second service conveyor 24, through second switching station S2, preferably after a new fully functioning label holder 17 has been fed to second conveyor 15.

Then, the defective label holder 17 can be removed, manually or automatically, from second service conveyor 24.

Figure 4:
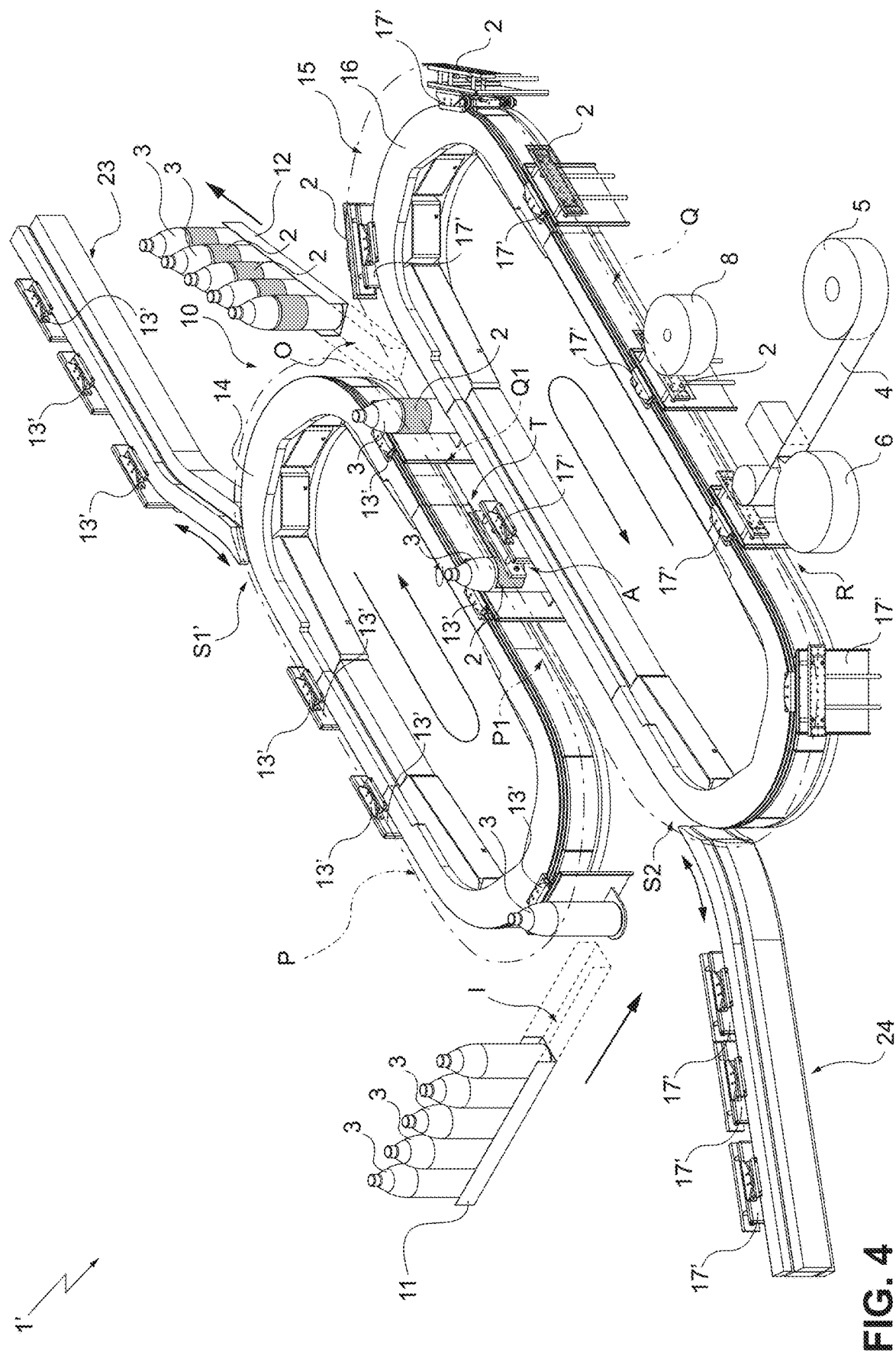
FIG. 4 is a schematic perspective view, with parts removed for clarity, of a labelling machine according to a second embodiment of the present invention.
Figure 5:
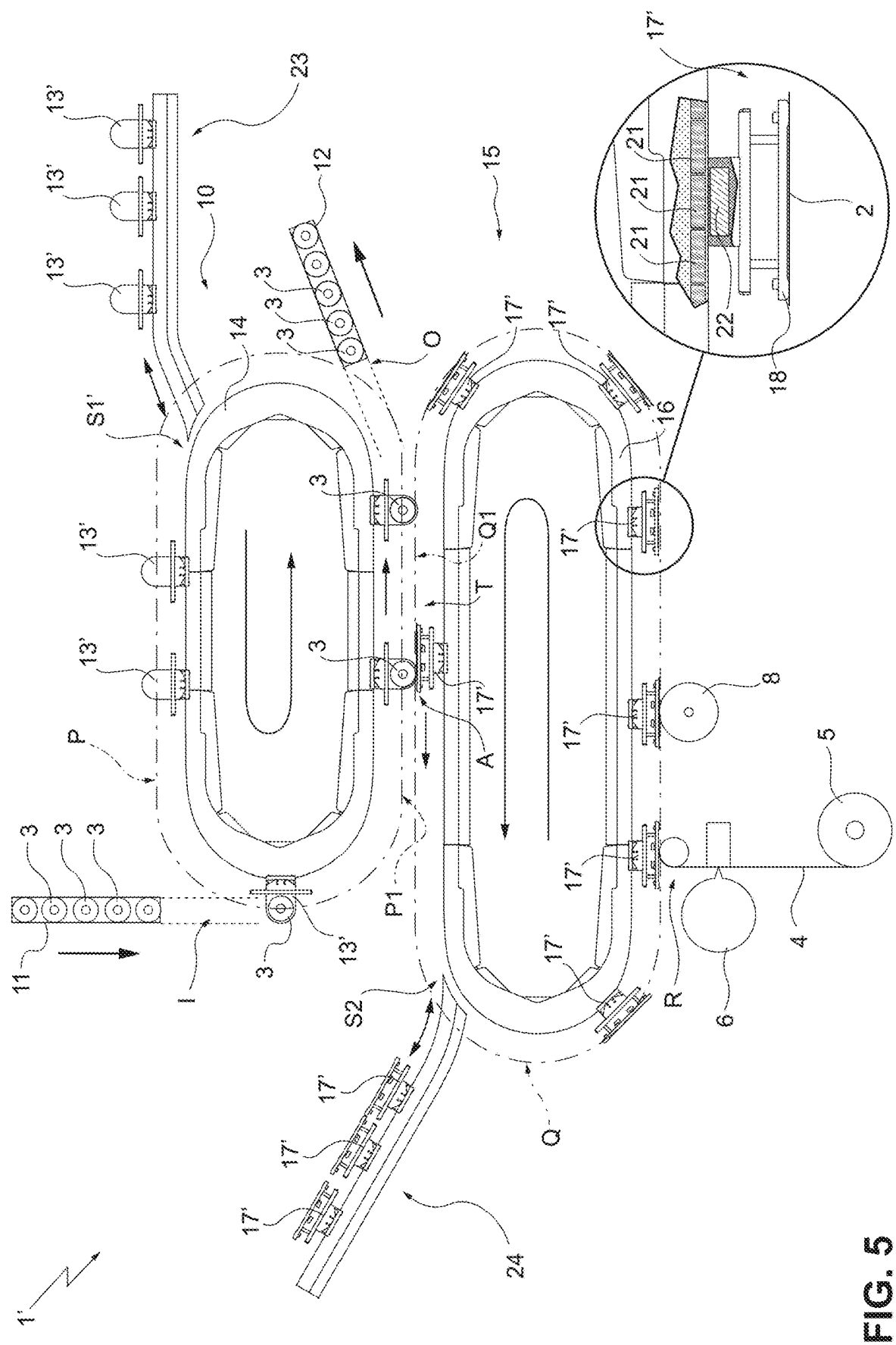
FIG. 5 is a top view, with parts removed for clarity, of the labelling machine of FIG. 4.

Number 1' in FIGS. 4 and 5 indicates as a whole a labelling machine of the above-described type according to a second preferred embodiment of the present invention.

Since labelling machine 1' is similar to labelling machine 1, the following description is limited to the differences between them, using the same references, where possible, for identical or corresponding parts and components.

In particular, labelling machine 1' differs from labelling machine 1 by comprising article holders 13' and label holders 17' which are configured to move, i.e. to slide, along opposite directions while moving, in use, along straight portion P1 and straight portion Q1, respectively.

In other words, each article holder 13' and the corresponding label holder 17' adapted to cooperate with the former are configured to move, i.e. to slide, along opposite directions while moving within label transfer area T.

In particular, according to this second preferred embodiment of the present invention, article holders 13' are configured to slide counterclockwise along first track 14, and label holders 17' are also configured to slide counterclockwise along second track 16.

Therefore, they are configured to slide along two discordant (opposite) directions while sliding along straight portions P1 and Q1, respectively, as shown in FIGS. 4 and 5.

Due to this configuration, article holders 13' do not need any means, i.e. a motor, for causing the respective article 3 to be labelled to rotate about its longitudinal axis.

Accordingly, in this case the rotation of each article 3 about its longitudinal axis is automatically imparted by the relative opposing movement of each article holder 13', along straight portion P1, and of the corresponding label holder 17', along straight portion Q1, during their passage within label transfer area T, without the need for a motor causing such rotation.

In one embodiment, this is possible preferably thanks to the fact that receiving wall 18 of each label holder 17' cooperates in contact in a substantially tangential manner with the outer lateral surface of the relative article 3 to be labelled at label transfer area T. This causes such article 3 to rotate due to friction between its outer lateral surface and receiving wall 18.

According to an alternative embodiment not shown, also article holders 13' of labelling machine 1' comprise respective motors for imparting a rotation of the relative articles 3 about their respective longitudinal axes.

According to this second preferred embodiment, first switching station S1' is arranged downstream of output station O and upstream of input station I, relatively to the counterclockwise advancement direction of article holders 13' along article path P.

The advantages of labelling machine 1, 1' according to the present invention will be clear from the foregoing description.

In particular, since both articles 3 and labels 2 are advanced along the respective article path P and label path Q by conveyors of the linear motor type, there is no need for pitch control means, such an infeed auger. The pitch can be controlled and adjusted automatically by independently controlling the speed of each article holder 13, 13' and label holder 17, 17'. In this way, the flexibility of labelling machine 1, 1' is improved.

Furthermore, this configuration provides for a real-time adjustment in case an error is detected, for example if an article 3 is missing on an article holder 13, 13' or a label 2 is missing or not properly received or applied. In this way, the overall reliability of labelling machine 1, 1' is improved.

In addition, thanks to the presence of the first and second service conveyors 23, 24, a fast, efficient and automatic format change can be performed, thereby improving the overall efficiency of the labelling process.

Also, the first and second service conveyors 23, 24 allows to perform a fast and real-time substitution of a malfunctioning article holder 13, 13' or label holder 17, 17', thereby limiting the stopping time of the labelling process.

Moreover, in the case of labelling machine 1', the architecture is simplified, since article holders 13' does not need a motor for controlling the rotation of articles 3 about their respective longitudinal axes.

This results also in a faster label transfer, so that the extension of label transfer area T can be reduced, thereby reducing the overall size of labelling machine 1'. This aspect also determines an improvement of the reliability of the machine 1' and reduces the overall costs.

Clearly, changes may be made to labelling machine 1, 1' as described and illustrated herein, without, however, departing from the scope of protection as defined in the accompanying claims.

The invention claimed is:

1. A labelling machine (1) configured to apply labels (2) onto articles (3) for containing a pourable product, said labelling machine (1) comprising:
    a first endless conveyor (10) configured to advance a number of said articles (3) along at least part of an endless article path (P), from an input station (I), at which the articles (3) to be labelled are fed to said first conveyor (10), to an application station (A), at which said articles (3) are sequentially labelled, and from said application station (A) to an output station (O), at which the labelled articles (3) exit from said first conveyor (10); and
    a second endless conveyor (15) configured to advance a number of said labels (2) along at least part of an endless label path (Q), from a receiving station (R), at which a sequence of said labels (2) is fed to said second conveyor (15), to said application station (A), at which said labels (2) are sequentially applied onto respective articles (3);
    wherein:
    said first conveyor (10) comprises at least one article holding device (13) movably coupled to said first conveyor (10), configured to carry one respective article (3) from said input station (I) to said output station (O) and controllable along said article path (P) by means of magnetic-inductive interaction;
    said second conveyor (15) comprises at least one label holder (17) movably coupled to said second conveyor (15), configured to carry one respective label (2) from said receiving station (R) to said application station (A) and controllable along said label path (Q) by means of magnetic-inductive interaction
    said first conveyor and said second conveyor (15) are peripherally arranged with respect to one another at said application station (A), thereby defining, therebetween, a label transfer area (T) having said application station (A) and within which the application of each label (2) onto the respective article (3) takes place;
    said article holding device (13) and said label holder (17) being configured to interact with one another at said label transfer area (T), so as to determine the application of said respective label (2) onto said respective article (3);
    said first conveyor (10) comprises a first oval shaped endless track (14), defining said article path (P),
    said second conveyor (15) comprises a second oval shaped endless track (16), defining said label path (Q):
    each label holder (17) comprises a cart (17a) slidingly coupled to said second track (16), and a holding device (17b) fitted to said cart (17a) and configured to receive and retain one label (2) at a time from said receiving station (R) and to release the same at said application station (A),
    said holding device (17b) of each label holder (17) is provided with a receiving wall (18) configured to sequentially cooperate in contact with labels (2);
    said receiving wall (18) is further provided, at opposite lateral end portions thereof, with a leading pad (20) and a trailing pad (20), each also provided with ports (19) and configured to retain respectively a leading end and a trailing end of the label (2);
    said article path (P) is substantially oval shaped and comprises a straight portion (P1), extending at said label transfer area (T);
    said label path (Q) is oval-shaped and comprises a straight portion (Q1) extending at said label transfer area (T) and facing said straight portion (P1) of said article path (P).

2. The labelling machine as claimed in claim 1, wherein said magnetic-inductive interaction along the article path (P) or the or along the label path (Q) are established between respective individually-excitable solenoids (21) and permanent magnets (22).

3. The labelling machine as claimed in claim 2, wherein said first endless track (14) defines said article path (P) and comprises a plurality of said individually-excitable solenoids (21); said article holding device (13) being movably coupled to said first track (14) and carrying one said permanent magnet (22);
    and wherein said second endless track (16) defines said label path (Q) and comprises a plurality of said individually-excitable solenoids (21); said label holding device (17) being movably coupled to said second track (16) and carrying one said permanent magnet (22).

4. The labeling machine as claimed in claim 3, wherein said first conveyor (10) comprises a plurality of said article holding devices (13) movably coupled to said first track (14) and configured to be controlled along said article path (P) independently from one another;
    and wherein said second conveyor (15) comprises a plurality of said label holders (17) movably coupled to said second track (16) and configured to be controlled along said label path (Q) independently from one another.

5. The labelling machine (1) as claimed in claim 1, wherein said article holding device (13) and said label holder (17) are configured to move along a same direction while moving, in use, within said label transfer area (T).

6. The labelling machine (1) as claimed in claim 1, wherein said article holding device (13) and said label holder (17) are configured to move along opposite directions while moving, in use, within said label transfer area (T).

7. The labelling machine as claimed in claim 1, further comprising at least one service conveyor (23, 24) arranged peripherally to at least one of said first conveyor (10) or second conveyor (15) and configured to selectively receive/feed at least one of said article holding device (13) or label holder (17) from/to said one of said first conveyor (10) or second conveyor (15) at a switching station (S1, S2) thereof;
    said article holding device (13) or label holder (17;) being movable along said service conveyor (23, 24) by means of magnetic-inductive interaction.

8. The labelling machine as claimed in claim 7, comprising a first said service conveyor (23) arranged peripherally to said first conveyor (10) and configured to selectively receive/feed said article holding device (13) at a first switching station (S1);
    said labelling machine (1) further comprising a second said service conveyor (24) arranged peripherally to said second conveyor (15) and configured to selectively receive/feed said label holder (17) at a second switching station (S2).

9. The labelling machine as claimed in claim 8, wherein said first conveyor (10) comprises a plurality of said article holding devices (13) movably coupled to said first conveyor (10) and exchangeable between said first conveyor (10) and said first service conveyor (23) at said first switching station (S1), for replacing said article holding devices (13) with others of different type in case of switching of article format;

and wherein said second conveyor (15) comprises a plurality of said label holders (17) movably coupled to said second conveyor (15) and exchangeable between said second conveyor (15) and said second service conveyor (24) at said second switching station (S2), for replacing said label holders (17) with others of different type in case of switching of label format.

10. The labelling machine as claimed in claim 8, wherein said second switching station (S2) is arranged downstream of said application station (A) and upstream of said receiving station (R), relative to the advancement direction of said label holder (17) along said label path (Q).

11. The labelling machine (1) as claimed in claim 10, wherein said first switching station (S1) is arranged downstream of said input station (I) and upstream of said output station (O), relative to the advancement direction of said article holding device (13) along said article path (P).

12. The labelling machine (1) as claimed in claim 10, wherein said first switching station (S1) is arranged downstream of said output station (O) and upstream of said input station (I), relative to the advancement direction of said article holding device (13') along said article path (P).

13. The labelling machine as claimed in any one of the foregoing claims, wherein said label holder (17) is configured to selectively retain and advance one label (2) at a time from said receiving station (R) to said application station (A); said label holder (17) being configured to retain said label (2) by means of suction.

* * * * *